March 10, 1936. R. REICHMANN 2,033,300
METHOD OF MAKING COMPACT BODIES CONSISTING OF
PURE MAGNESIUM OXIDE OR BERYLLIUM OXIDE
Filed Feb. 20, 1933
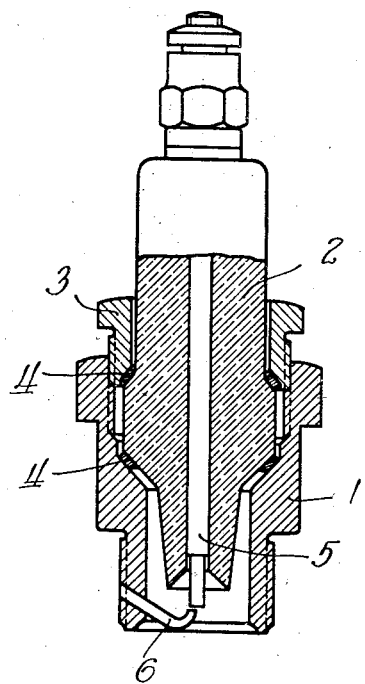
Inventor:
Reinhold Reichmann
By
Atty.

Patented Mar. 10, 1936

2,033,300

UNITED STATES PATENT OFFICE 2,033,300

METHOD OF MAKING COMPACT BODIES CONSISTING OF PURE MAGNESIUM OXIDE OR BERYLLIUM OXIDE

Reinhold Reichmann, Berlin, Germany, assignor to Siemens & Halske, Aktiengesellschaft, Siemensstadt, near Berlin, Germany, a corporation of Germany Application February 20, 1933, Serial No. 657,617
In Germany November 19, 1932

17 Claims. (Cl. 18—47.5)

My invention relates to a method of making compact bodies consisting of pure magnesium oxide or beryllium oxide.

Magnesium oxide and beryllium oxide belong to that class of non-plastic metallic oxides which may be molded by employing special measures and sintered at high temperatures. Such substances have not been employed heretofore to any appreciable extent. This is due to the fact that beryllium oxide is very expensive and also because the manufacture of the articles made therefrom introduces difficulties and causes additional expenses, due to the high temperatures required for sintering. In the case of beryllium oxide, the sintering temperature is around 2000° C. owing to its high fusing temperature of 2340° C., and in the case of magnesium oxide which has a fusing temperature of 2800° C., the sintering temperature to be applied would have to be even above 2000° C.

Highly sintered beryllium oxide is characterized by great hardness, and by its good electric insulating qualities which are manifest even in the presence of high temperatures. It is also considerably insensitive to temperature changes. Accordingly, a more extensive use of this material would be of advantage.

Magnesium oxide, on the other hand, is relatively cheap. However, compact bodies can be obtained only at uneconomically high sintering temperatures.

It is possible, however, to reduce the sintering temperatures materially and to obtain nevertheless compact bodies, as well as to solve the question of costs in the case of beryllium oxide, provided the main quantity of practically pure magnesium oxide or beryllium oxide to be treated is mixed with small amounts of another non-plastic metallic oxide so that about 1 mole of added oxide is mixed with about 10 to 80 moles of the main substance. As admixtures for magnesium oxide, aluminum oxide or beryllium oxide are chiefly employed and, on the other hand, as admixtures for beryllium oxide, aluminum oxide or magnesium oxide may be used.

According to the above-mentioned proportions, compact bodies having the properties of the main substance contained therein are obtained at sintering temperatures of 1700° C. to 1800° C.; that is to say, at temperatures which are far below the fusing temperature of the beryllium oxide and still farther below the fusing temperature of magnesium oxide. The attainment of these temperatures does not cause difficulties. The heat input required for obtaining such temperatures lies within reasonable economical limits.

It might have been expected that the combination of magnesium oxide as well as of beryllium oxide with aluminum oxide is most favorable, if it is effected in a molecular proportion, i. e., if the formation of spinel takes place. However, careful and extensive tests have shown that this is not the case. Far more favorable results can be attained if the added oxide is employed in considerably smaller amounts.

The calcined substances finely divided and thoroughly mixed under a high pressure may be pressed into bodies. These bodies are so compact that they may be taken out of the forms or molds without detriment and placed into the furnace. However, if desired, a small amount of a suitable binding agent, such as gum tragacanth may be added to the metallic oxides and intimately mixed therewith, e. g., by the use of press rollers as described in my co-pending application, Serial No. 650,462, filed January 6, 1933. The resulting mixture may then be suitably molded, e. g., by extrusion thru a suitable nozzle or mouthpiece, and the air-dried pressings may be sintered at a temperature of about 1700° C. to 1800° C. The bodies produced in this manner may be employed for electric insulation in view of their high-electrical resistance. The dielectric losses of such bodies are small but they are, therefore, suitable for high frequency purposes. Protective tubes and holders for heating resistances, pyrometer tubes and apparatus for laboratories are further fields of application. There are a great number of other fields of application for such bodies.

It has already been proposed to make compact articles consisting of zirconium oxide and other highly refractory oxides by firing the oxides first to a temperature of 1650° C. or above. The material thus roasted dead or rendered inactive is then mixed with small amounts of oxides of magnesium and aluminum, and a salt solution of the oxides to be rendered plastic, or of the admixed oxides. Data on sintering temperatures to be applied are not available.

With this method the firing of the main constitutents of the mass to be molded so as to render them inactive requires an uneconomically great heat input, since they must be again cooled down before being further treated. Since the greatest part of the mass consists of material dead roasted or rendered completely inactive, it is clear that the results to be expected can either not be attained at all or only upon applying sintering temperatures which lie considerably closer to the fusion point of the material than if the material rendered completely inactive by firing would not have been used.

It is true that an admixture of a salt solution ($MgCl_2$ to $MgC$) results in a high resistance to dryness in view of the formation of cement. However, the formation of cement subjects the bodies to hydrolysis, consequently, moisture is retained, and the firing of such bodies, especially at the beginning of the firing process, requires particular precautions.

According to my invention, the substances employed are roasted (calcined) only at a moderate temperature, thereby preserving the capability of forming solid and compact bodies by the coalescence of crystals. The heat input necessary for the dead roasting is thereby avoided. The pulverization of the calcined substances is also rendered simpler and can be carried out at smaller expense than the pulverization of substances prefired at high temperatures. Due to thorough mixing and pressing or preforming in the presence of a binding agent and by the application of suitable press rollers or the like, the particles are brought so close to one another during the forming and molding operations that the hardening during the firing takes place without any formation of flaws. Very compact bodies are therefore obtained.

A great variety of articles for widely different uses and purposes, such for example as mentioned previously, may be successfully produced by employing the method described above.

One form of applying the invention to practical use is shown on the accompanying drawing illustrating, in a single figure, a spark plug, partly in elevation and partly in cross section.

The spark plug shown in the drawing comprises a shell 1 holding the insulating member 2 by means of the tubular nut 3. Gaskets such as indicated at 4 are interposed for obtaining a tight fit. An electrode 5 extends thru the insulating member 2, as shown, and cooperates in the usual manner with the electrode 6 provided on the shell 1. The insulating body 2 may be made in accordance with the novel process and method described herein.

I claim as my invention:

1. As an article of manufacture, a spark plug having an electric insulator made of practically pure oxide material, said material containing $Be_2O_3$ as main constituent.

2. The method of producing a compact sintered body having as a main constituent practically pure magnesium oxide, consisting in subjecting said main constituent to a heat treatment to obtain a calcined oxide, mixing said calcined oxide with a non-plastic oxide of the magnesium group, forming said body from the resultant mixture, and sintering said formed body at a temperature considerably below the fusing point of said main constituent.

3. The method of producing a compact sintered body having as a main constituent practically pure magnesium oxide, consisting in subjecting said main constituent to a heat treatment to obtain a calcined oxide, mixing said calcined oxide with a non-plastic oxide of the magnesium group, forming said body from the resultant mixture, and sintering said formed body at a temperature between 1700° C. to 1800° C.

4. The process of producing a compact sintered body of the class described, wherein the main substance consists of practically pure magnesium oxide, comprising heat treating said main substance to obtain calcined oxide, mixing about 10 to 80 moles of said calcined main oxide with about 1 mole of non-plastic oxide of the magnesium group, forming said bodies from the resulting mixture, and sintering said formed bodies at a temperature considerably below the fusing point of said main substance.

5. In a process of producing compact sintered bodies of the class described, the steps comprising, taking a main substance consisting of a predetermined quantity of a finely ground calcined practically pure metallic oxide, adding thereto not over 5% of a substance consisting of another finely ground practically pure calcined metallic oxide, intimately mixing said substances to form a plastic mixture, shaping said bodies from said mixture, and sintering said bodies at a temperature considerably below the fusing point of said main substance.

6. The method of making compact sintered bodies consisting of practically pure oxides of the magnesium group, which comprises taking a calcined main oxide, adding to said oxide a small quantity of another non-plastic metallic oxide, mixing said oxides and forming said bodies therefrom, and then sintering said bodies at a temperature considerably below the fusing point of the main oxide.

7. The method of making compact sintered bodies consisting of practically pure oxides of the magnesium group, which comprises taking a non-plastic main oxide, adding to said oxide a small quantity of calcined oxide of the magnesium group, mixing said oxides and forming said bodies therefrom, and then sintering said bodies at a temperature considerably below the fusing point of the main oxide.

8. The method of making compact sintered bodies consisting of practically pure oxides of the magnesium group, which comprises adding to magnesium oxide a small quantity of alumina, mixing said oxides and forming said bodies therefrom, and then sintering said bodies at a temperature considerably below the fusing point of the main oxide.

9. The method of making compact sintered bodies consisting of practically pure oxides of the magnesium group, which comprises adding to magnesium oxide a small quantity of beryllium oxide, intimately mixing said oxides and forming said bodies therefrom and sintering said formed bodies at a temperature considerably below the fusing point of said magnesium oxide.

10. The method of making compact sintered bodies consisting of practically pure oxide, which comprises adding to beryllium oxide a small quantity of magnesium oxide, intimately mixing said oxides and forming said bodies therefrom and then sintering said bodies at a temperature considerably below the fusing point of said beryllium oxide.

11. The method of making compact sintered bodies of practically pure metallic oxide, which comprises taking about 10 to 80 moles of beryllium oxide, adding thereto about 1 mole of magnesium oxide, mixing said oxides, forming said bodies from said oxides, and sintering said bodies at a temperature of about 1700° C. to 1800° C.

12. The method of making compact sintered oxide bodies which comprises, taking practically pure beryllium oxide, adding thereto not over 5% alumina, mixing said substances, forming the bodies from the resulting mixture, and sintering said bodies at a temperature of about 1700° C. to 1800° C.

13. The method of producing a compact sintered body having as a main constituent practically pure beryllium oxide, consisting in subjecting said beryllium oxide to a heat treatment to obtain calcined oxide, adding thereto a small amount of another non-plastic metallic oxide, mixing said oxides, forming said body from said mixture, and sintering said body at a temperature considerably below the fusing point of said beryllium oxide.

14. The process of producing a compact sintered body containing practically pure beryllium oxide as a main constituent, comprising heat treating said beryllium oxide to obtain calcined oxide, mixing about 10 to 80 moles of said calcined main oxide with about 1 mole of another non-plastic metallic oxide, forming said body from the resulting mixture, and sintering said formed body at a temperature considerably below the fusing point of said beryllium oxide.

15. In a process of making an electric insulator containing $Be_2O_3$ as main constituent, the steps comprising, mixing with the substance constituting said main constituent about 5% of a non-plastic oxide, forming said insulator from the resulting mixture, and sintering said formed insulator at a temperature which is below the fusing temperature of said main constituent.

16. The process of making compact sintered oxide bodies which comprises, taking a finely divided calcined oxide forming the main constituent of said bodies, adding thereto another finely divided calcined non-plastic metallic oxide in an amount not causing the formation of spinel, mixing said oxides, forming said bodies from said mixture, and sintering the formed bodies at a temperature which is considerably below the fusing temperature of said oxide forming said main constituent.

17. The method of making compact sintered bodies consisting of practically pure oxides of the magnesium group, which comprises, mixing about 10 to 80 moles of a main metallic oxide with about 1 mole of another nonplasic metallic oxide, to form a plasic mixture, forming said bodies from said mixture, drying the formed bodies, and sintering said bodies at a temperature of about 1700° to 1800° C.

REINHOLD REICHMANN.